United States Patent [19]
Wilson

[11] 3,981,672
[45] Sept. 21, 1976

[54] APPARATUS FOR FORMING A PARISON

[75] Inventor: Newton R. Wilson, Bartlesville, Okla.

[73] Assignee: Phillips Petroleum Company, Bartlesville, Okla.

[22] Filed: Dec. 10, 1974

[21] Appl. No.: 531,448

Related U.S. Application Data

[62] Division of Ser. No. 338,250, March 5, 1973, Pat. No. 3,914,366.

[52] U.S. Cl. .............................. 425/467; 425/380; 425/DIG. 206
[51] Int. Cl.² ........................................ B29D 23/04
[58] Field of Search .......... 425/380, 381, 466, 460, 425/467, 325, 326 B, 242 B, 326 R, 387 B, DIG. 216, 242 R, DIG. 206

[56] References Cited
UNITED STATES PATENTS

| | | | |
|---|---|---|---|
| 2,780,835 | 2/1967 | Sherman | 425/466 X |
| 2,987,766 | 6/1961 | Porter | 425/467 |
| 3,309,443 | 3/1967 | Scott et al. | 425/326 B |
| 3,315,307 | 4/1967 | Hurd et al. | 425/380 X |
| 3,583,033 | 6/1971 | Christofas et al. | 425/326 R X |

Primary Examiner—Ronald J. Shore
Assistant Examiner—Mark Rosenbaum

[57] ABSTRACT

A die for passing blow-moldable plastic material through an annulus of the die for forming a parison adapted for forming a molded article of substantially uniform wall thickness. During forming of the material in the die, first and second areas of increased wall thickness are formed on the material, the thickened portions only are thereafter progressively decreased in thickness to form a uniform cross-section and thereafter the material is discharged from the die.

6 Claims, 3 Drawing Figures

APPARATUS FOR FORMING A PARISON

This is a divisional application of copending application Ser. No. 338,250, filed Mar. 5, 1973, now U.S. Pat. No. 3,914,366.

It is desirable in blow molding operations to form articles having the thinnest walls that are consistent with the strength requirements of the article. In the use of a generally cylindrical-shaped parison, the parison is forced to assume a more oval cross-sectional configuration by closing of the mold and pinching off the parison at either end. The effects of the oval cross-sectional configuration are especially pronounced at the parison ends corresponding to a shoulder and a bottom of the article where said article is, for example, a container. According to this oval cross-sectional configuration in the mold cavity, portions of the parison oriented about 90° relative to the parting line of the mold must travel further to reach their respective mold walls than parts of the parison adjacent the parting line of the mold. This increased travel distance, therefore, causes the completed article to be thinner walled over the portions which travel the greater distances.

Although the above-described wall thinning occurs in the forming of cylindrical articles, said wall thinning becomes increasingly pronounced when forming articles of other configurations such as square, oval, etc.

Heretofore utilized methods of correcting the problem include shaping the die lips to increase the wall thickness of the parison on selected portions of the parison. This, however, caused the parison extruding from the die to sometimes twist and move the thickened areas to undesirable locations relative to the mold parting lines and, therefore, reduce the benefit derived by forming the thickened areas. The parison in some cases twisted 90 degrees from the desired orientation and thereby compounded the problem.

By constructing the die differently and forming the parison by the method of this invention, we have discovered, however, that a parison having areas of greater wall thickness can be formed which will not twist and become disoriented during extrusion of the parison.

This invention, therefore, resides in an apparatus for passing blow-moldable plastic material through an annulus of a die for forming a parison adapted for forming an article of substantially uniform wall thickness. During forming of material in the die, first and second areas of increased wall thickness are formed on the material, the thickened portions only are thereafter progressively decreased in thickness to form a uniform cross-section and thereafter the material is discharged from the die.

Other aspects, objects, and advantages of the present invention will become apparent from a study of the disclosure, the appended claims, and the drawing.

The drawings are diagrammatic sectional views of the apparatus of this invention.

Figure 1:
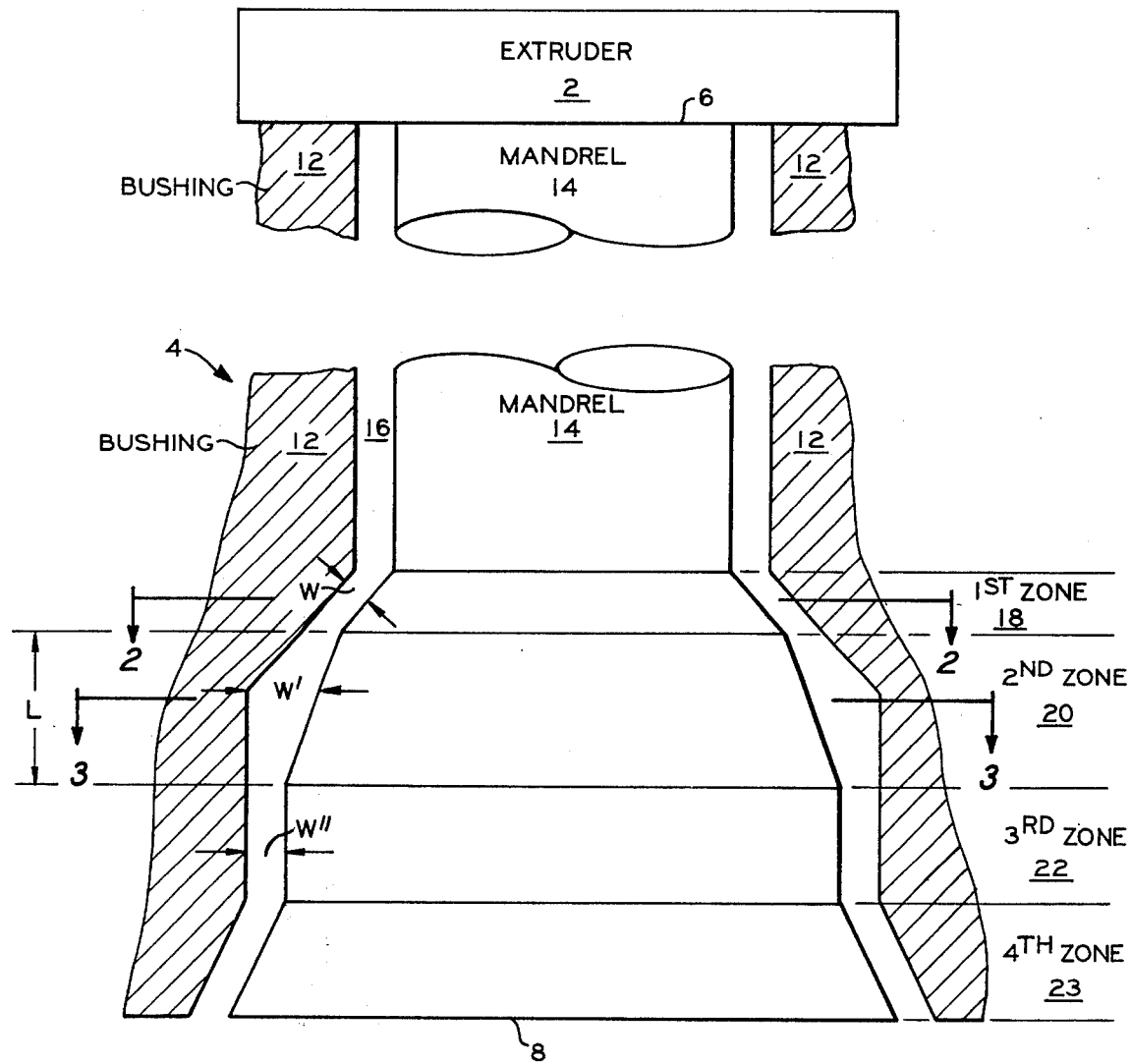
FIG. 1 shows a partial sectional view of an extruder and die assembly.

Referring to the drawings, an extruder 2 has a die assembly 4 associated therewith as is known in the art. Blow-moldable plastic material such as ethylene polymers, propylene polymers, styrene polymers, polyamides, and others, as known in the art, are continuously processed in the extruder 2 and injected into and through the die assembly 4 for forming the parison. As is further known in the art, an article mold is generally positioned adjacent the die for receiving the extruding parison and blow molding articles therefrom.

The first end 6 of the die 4 is connected to the extruder 2 and the second end 8 is positioned adjacent molding apparatus (not shown).

The die assembly 4 has a bushing 12, and a mandrel 14 positioned within the bushing 12. The bushing 12 and mandrel 14 are of dimensions sufficient for forming an annulus 16 between the bushing 12 and the mandrel 14 as known in the art. The annulus 16 is open at both ends 6, 8 of the die assembly 4.

Annulus 16, over a length along the axis thereof is comprised of first, second, third and fourth respective zones 18, 20, 22 and 23 as moving from the first end 6 toward the second end 8 of the die 4.

Figure 2:
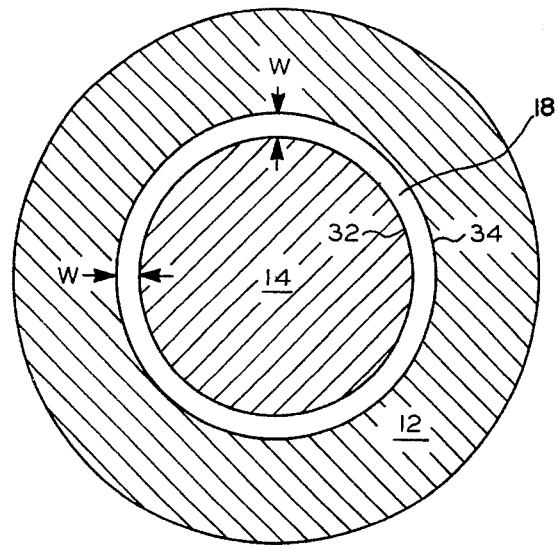
FIGS. 2 and 3 are sectional views taken across the die of FIG. 1.

Referring to FIGS. 1 and 2, the first annular zone 18 is of a generally circular or ring cross-sectional configuration and of a substantially uniform width (W).

Figure 3:
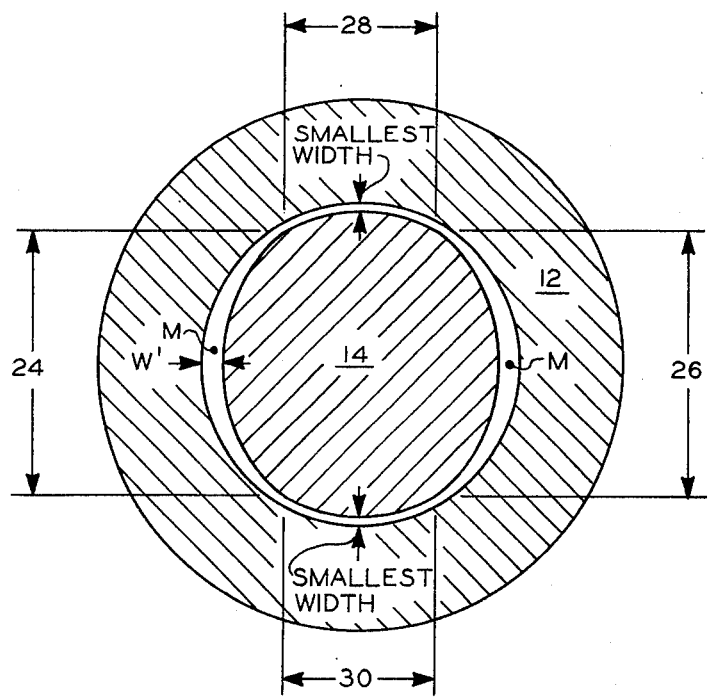

Referring to FIGS. 1 and 3, the second annular zone 20 is abutting the first annular zone 18 and is positioned downstream therefrom in a direction toward the second end 8 of the die 4.

The second zone 20 has first and second, diametrically opposed portions 24, 26. These portions can be spaced apart as later described. Each of the portions 24, 26 has a nonuniform cross-section. The width (W') of the first and second portions 24, 26 progressively decreases in a clockwise and a counterclockwise direction from a medium locus M (FIG. 3) of said first and second portions 24, 26 the directions being taken at right angle to the axis of the mandrel. The width (W') of each first and second portions 24, 26 progressively increases and then progressively decreases along a portion of the length L (FIG. 1) of the second zone 20 moving in a direction from the first zone 18 toward the second end 8.

The first and second portions 24, 26 can each form up to 180° of the parison or have one of third and fourth parison portions 28, 30 positioned between adjacent ends of the first and second portions 24, 26 with said first and second portions each forming at least 90° of the parison.

It is preferred that the third and fourth portions 28, 30 have a common or symmetrical widths over the length of the second zone 20 and that the first and second zones 24, 26 have a commonly tapering or symmetrical widths relative over the length of the second zone 20. This, however, is dependent upon the configuration of the mold cavity in which it will be utilized. In special molding it may be advantageous to have the width of the corresponding portions 24, 26 on the one hand and 28, 30 on the other different from one another.

For the generally produced articles which have symmetrical halves as divided by a plane oriented 90° relative to the parting line of the mold, the common wall thickness of the third and fourth portions 28, 30 are preferred to assure uniform wall thickness of the portions in the final product. However, where one of the third or fourth portions must travel farther during blow molding operations than the other of said third or fourth portions, then the portion traveling the farthest is preferably thicker than its corresponding portion in order to assure a uniform wall thickness in the final product.

Providing the thickness of a parison portion relative to the distance that portion must travel with resultant stretch and thinning of that portion to assure common wall thickness in the final product or controlled wall thickness at preselected locations is known in the art as set forth above and as described in U.S. Pat. No. 3,309,443.

It has been discovered, however, that the control of the thickened portions and the resultant parison are improved by this invention. As will be noted in the drawings and the description thereof relative to similar apparatus known in the art, the taper and width of the first and second annular portions 24, 26 decreases to form an annulus of uniform width (W') in passing along a portion of the second zone 20 to the third zone 28 as opposed to heretofore utilized methods and apparatus where comparable first and second portions increase in width in said direction. At the termination of the second zone and through the third zone the width (W') is generally substantially uniform about the circumference of the annulus.

In the fourth zone 23, the annulus 16 can diverge relative to the die axis along the length of said third zone in a direction from the second zone 20 toward the second end 8 for increasing the diameter of the annulus 16.

It is not completely understood how the enlargement in the second zone 20 and the tapering of the first and second portions 24, 26 along a portion of the length of the second zone 20 function to produce a parison with the improved properties of substantially nontwist, etc., as set forth above. It is believed, however, that the difference in flow dynamics of the molten material while passing through the die 4 results in the improved product relative to the material when passed through heretofore utilized dies where the first and second enlarged portions are formed at the die lips by progressively increasing thickness in a zone forming the second end 8 of the die assembly and having no decrease in diameter of the annulus after increasing the thickness.

In producing a parison for forming a bottle utilizing one embodiment of the invention, it has been found that a parison having excellent properties can be obtained where the largest width of the first and second annular portions 24, 26 of the second annular zone 20 is in the range of about 0.5 percent to about 10 percent greater than their associated smallest width, the first and second annular portions 24, 26 of the second annular zone 20 are in the range of about 90° to about 180° of the parison at a location at which the first and second annular portions are of their greatest width (W'). The median diameter of each of the zones 18, 20, 22 and 23 preferably progressively increases in passing from the first toward the second end of the die assembly.

It should be understood that the changes of width of the annulus can be formed by divergence or convergence of the wall of either the mandrel 14 or the bushing 12 relative to the other. Many heretofore utilized dies can be modified to practice this invention by machining metal from one or both of the mandrels and/or bushings in selected areas as set forth herein.

In the method of this invention, blow-moldable plastic material is injected from the extruder 2 into the annulus 16 at the first end 6, formed through the annulus, and discharged from the die 4 at the second end 8.

As shown in FIG. 2, the blow-moldable plastic material is formed to a configuration having a first generally circular or ring-shaped first cross-sectional configuration having inner and outer walls 32, 34 and a substantially uniform thickness or width (W).

As shown in FIG. 3, the thickness of the first and second spaced-apart, diametrically opposed portions 24, 26 of the first cross-section of FIG. 2 are enlarged with the thickness of each first and second portions 24, 26 progressively decreasing in a clockwise and a counterclockwise direction from a median locus (M) of a portion for forming a second cross-section of nonuniform cross-sectional configuration.

Referring to FIG. 1, the wall thickness of only the first and second portions 24, 26 of the second cross-section are progressively decreased in thickness during passage of the material through portions of the second zone 26 to form a third cross-section of uniform wall thickness.

The median diameter of the third cross-section is progressively enlarged during passage through the third zone 22 to form the resultant article.

The following table is a comparison of wall thicknesses of articles formed from a parison which was the product of the instant invention and articles formed from a parison which was the product of a die not having the second zone of the instant invention.

TABLE I

| Invention Die | | | Unmodified Die | | |
|---|---|---|---|---|---|
| Wall Thickness, Mils | | | | | |
| Shoulder | Middle | Bottom | Shoulder | Middle | Bottom |
| 29 | 30 | 25 | 22 | 29 | 21 |
| 28 PL | 23 PL | 30 PL | 35 PL | 31 PL | 39 PL |
| 28 | 31 | 25 | 22 | 31 | 21 |
| 28 PL | 22 PL | 30 PL | 35 PL | 30 PL | 39 PL |

The resin used was an ethylene/1-butene copolymer having a melt index of about 0.2 as determined by ASTM D1238-62T Condition E and a density of about 0.952 g/cc as determined by ASTM D1505-63T. Processing conditions were selected to produce parison weights of 173 grams which produced part weights of 120 grams in all instances. The melt temperature was 370°–375°F and the blow pressure was 80 psig in all cases.

The mandrel of the die was shaped in zone 2 so that the diameter of the unshaped section was 1.6 percent more than that of the shaped diameter. The results show that wall thickness of bottles made with the invention die are much more uniform in the more critical bottom and shoulder areas, especially bottom areas, than bottles made with a conventional die. Also, it is evident that the wall thickness of the shoulders and bottoms of the bottles 90 degrees opposite the parting line are thicker when the invention die is used even though the weight of the bottles is the same for bottles made from both dies. The variation observed in the wall thickness of the center area of bottles made with the invention die is tolerable since stresses induced in that area by pinch-off of the parison and weight of contained product are much less than in the top and bottom portions of the bottle.

Other modifications and alterations of this invention will become apparent to those skilled in the art from the foregoing discussion and accompanying drawing, and it should be understood that this invention is not to be unduly limited thereto.

What is claimed is:

1. A die for forming a parison of blow-moldable material, said die having first and second open ends, a bushing and a mandrel positioned within the bushing, said mandrel and bushing each being of dimensions forming an annulus therebetween, said annulus having first, second, and third annular zones along its axis from the entrance end toward the exit end of the die, the first annular zone being of a generally uniform first width and of a generally circular cross-section, the second annular zone having first and second diametrically opposed portions each being of a greater second width than said first width, the second width of each first and second portion progressively decreasing in a clockwise and a counterclockwise direction from a median locus of said first and second portions, the directions being taken at right angle to the axis of the mandrel, the second width of each of said first and second portions along the length of said second annular zone progressively increasing in an upper portion of said second annular zone and then decreasing in a lower portion of said second annular zone in a direction from the entrance end toward the exit end of the die, and said third annular zone being of a generally uniform third width, said third width being less than the second width taken along the length of said second annular zone.

2. An apparatus, as set forth in claim 1 wherein the largest width of each first and second annular portion of the second annular zone is in the range of about 0.5 percent to about 10 percent greater than their associated smallest width.

3. An apparatus, as set forth in claim 1 wherein the first and second annular portions of the second annular zone each form in the range of about 90° to about 180° of the parison at a location at which the first and second annular portions are of their greatest width.

4. An apparatus, as set forth in claim 1 also having a fourth annular zone toward the exit end of the die from said third zone wherein the median diameter of the annulus as measured at the third zone is less than the median diameter of the annulus as measured at said fourth annular zone.

5. An apparatus, as set forth in claim 4 wherein the median diameter of the first zone is less than the median diameter of the second zone.

6. An apparatus, as set forth in claim 1 wherein the median diameter of the first zone is less than the median diameter of the second zone.

* * * * *